United States Patent Office 3,017,966
Patented Jan. 23, 1962

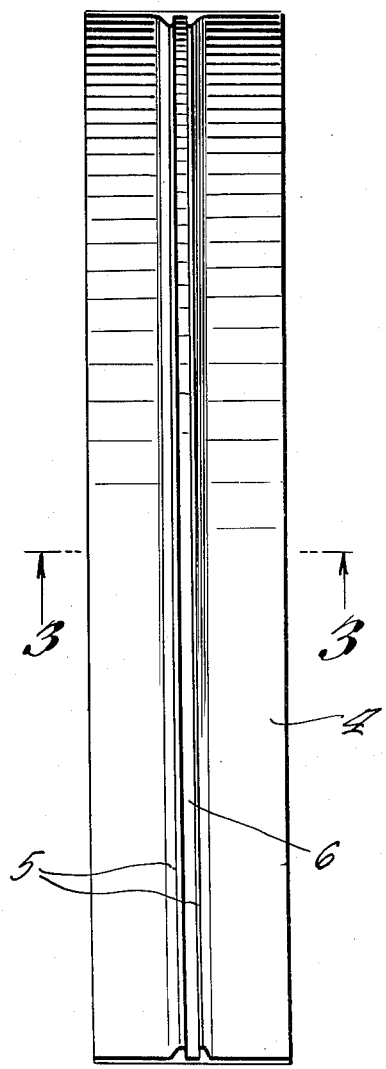
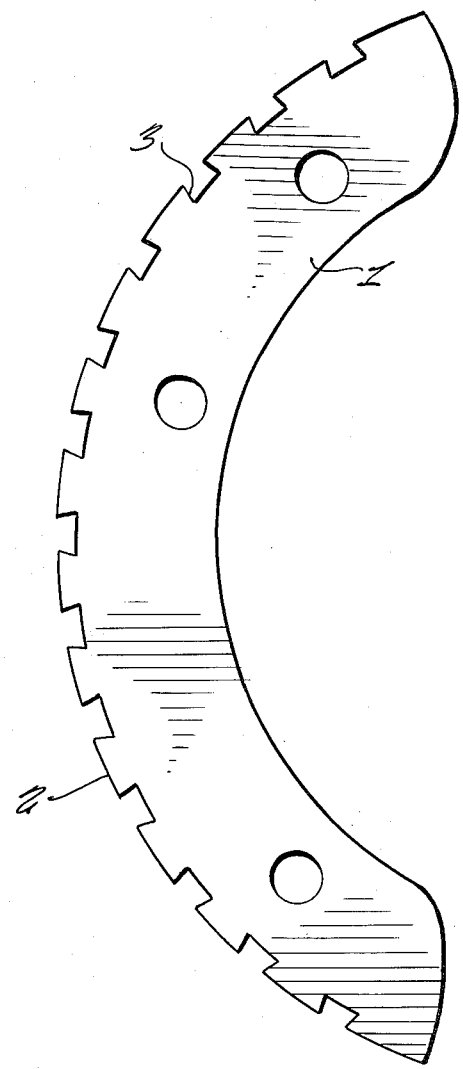
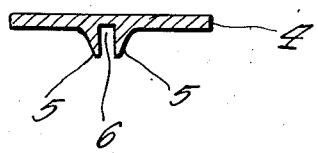

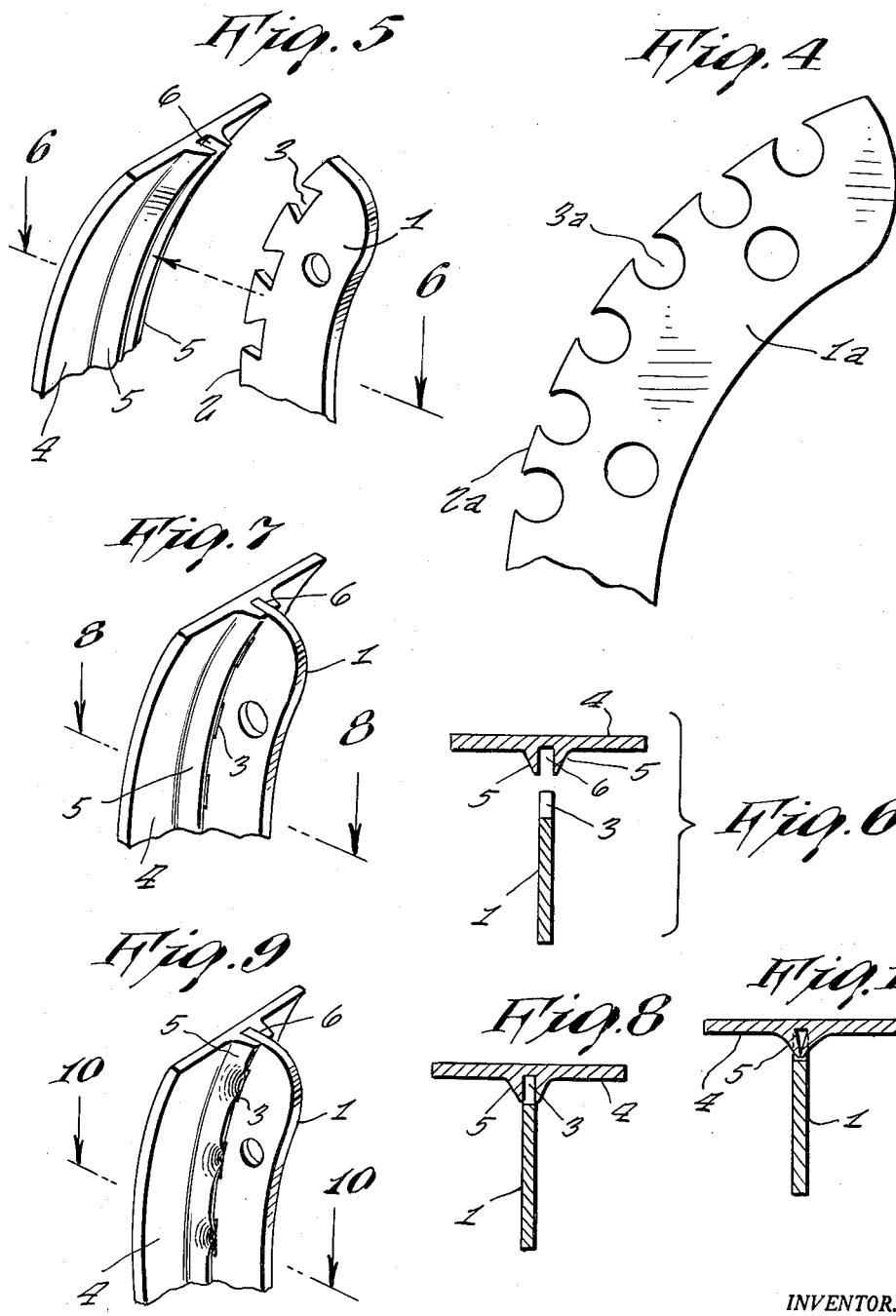

3,017,966
BRAKE SHOE AND METHOD OF MAKING SAME
Karl Betz, Frankfurt am Main, Germany, assignor to Mitteldeutsche Kuehlerfabrik G.m.b.H., Frankfurt am Main, Germany
Filed July 31, 1958, Ser. No. 752,685
5 Claims. (Cl. 188—252)

The present invention relates to brake shoes, more particularly to brake shoes built up of a web piece and a flange piece to support the lining.

It is known to make brake shoes from T-bars or other structural sections, or from web pieces and flange pieces, which are joined by electrical welding or other welding methods.

It is the object of the invention to provide brake shoes made entirely without application of welding methods.

This is accomplished, according to the invention, by providing a web piece on its outer edge with recesses having a restricted mouth, preferably of dove-tailed or i.e. trapezoidal incompletely circular shape, and by forming a flange piece with upstanding ribs flanking a central groove. The ribs are placed in locking engagement with the recesses of the web, and the two pieces are then joined by application of pressure.

By forcing the reduced edge portions of the ribs at spaced locations into the recesses of the web, an intimate rigid union of the pieces will be effected, which will prevent circumferential displacement of the same. Also, by proper selection of the angle at which the edges of the dovetailed recesses are converging, radial displacement of the parts can be eliminated.

A welding process for joining the pieces of the brake shoes according to the invention is therefore dispensed with; as an added advantage, no heat treatment will be necessary for the relief of stresses as they occur in the shoes when a welding process is applied. The shoes will remain perfectly true to gage, so that no finishing operation will have to be carried out.

The brake shoe according to the invention will now be illustrated, by way of example, in the accompanying drawing, but it should be understood that many changes can be made in the details without departing from the spirit of the invention.

In the drawing:

FIG. 1 shows a web piece with dove-tailed recesses;
FIG. 2 illustrates a flange piece;
FIG. 3 is a section thereof on line 3—3 of FIG. 2;
FIG. 4 shows another embodiment of the web piece with three-quarter recesses;
FIG. 5 is a fragmentary perspective view of the parts to be assembled;
FIG. 6 is a cross-section along line 6—6 of FIG. 5;
FIG. 7 is a view showing the web and flange pieces in the process of being assembled;
FIG. 8 is a cross section along line 8—8 of FIG. 7;
FIG. 9 is a finished assembly; and
FIG. 10 a cross-section on line 10—10 of FIG. 9.

Referring now to FIGS. 1 to 3:
FIG. 1 shows a web 1 having dove-tailed recesses 3 in its outer edge 2.

The arcuate flange piece 4 shown in FIG. 2 has on its concave side a central groove 6 bounded by upstanding ribs 5, as clearly seen in FIG. 3.

The process of assembling the pieces will be readily understood from FIGS. 5 to 10, wherein the reference numerals 1 to 6 designate the same elements as in FIGS. 1 to 3. It will be seen that the web member 1 is introduced into the groove 6 so that its convex edge 2 makes contact with the bottom of that groove for a firm interengagement of the two members.

In FIG. 7, the web 1 is shown after having been placed with the outer edge 2 in the groove 6 between the ribs 5 which are integral parts of the flange member 4, as shown.

FIGS. 9 and 10 are a partial showing of the finished brake shoe after the joining of the web and flange pieces by compression.

FIG. 4 shows another embodiment of the web piece, having a body 1a with three-quarter circular recesses 3a on the outer edge 2a. The process of assembling is the same as described for the first embodiment of the invention and as illustrated in FIGS. 5 to 10.

Thus, in each case an arcuate web piece 1, 1a is provided with recesses 3, 3a which form a converging mouth open toward the convex edge 2, 2a thereof. A flange piece 4 of similar curvature is formed with a beaded central groove 6 in such manner that the ribs 5 flanking this groove become progressively narrower in cross-section, and therefore more readily deformable, with increasing distance from the flange 4; this is clearly apparent from the drawing, especially FIGS. 3, 6, 8 and 10. The ribs are engaged with the recesses of the web. Pressure is applied at peripherally spaced locations to both ribs 5, as best seen in FIG. 9, thereby joining the members 1, 5 rigidly together. Circumferential displacement is thereby prevented as well as that in a radial direction. Neither heat treatment nor welding is required. The shoes formed by this method remain perfectly true so that no finishing operation is required.

I claim:
1. The method of permanently joining together a flange member with upstanding parallel ribs forming a groove therebetween and a web member having an edge fitting into said groove to produce an assembly adapted to be used as a brake shoe, which comprises the steps of forming in said web member a plurality of longitudinally spaced recesses convergingly open toward said edge, inserting said web member into said groove to a depth sufficient to place said edge in contact with the bottom of said groove, and deforming the tops of said ribs at spaced locations toward each other and into positive engagement with said recesses, thereby locking said web member to said ribs.

2. The method according to claim 1 wherein said recesses are of generally trapezoidal configuration.

3. The method according to claim 1 wherein said recesses are of incompletely circular configuration.

4. A brake shoe comprising a flange member provided with a pair of parallel ribs extending in longitudinal direction of said flange member and defining a groove therebetween, and a web member having an edge and a plurality of recesses spaced along said edge and convergingly open toward the latter, said web member being received in said groove with said edge contacting the bottom of said groove, said ribs being deformed at spaced locations into positive locking engagement with said recesses, thereby permanently fastening said web member to said flange member.

5. A brake shoe comprising an arcuate flange member provided on its concave side with a pair of integral parallel ribs of outwardly narrowing cross-section extending in longitudinal direction of said flange member and defining a groove therebetween, and an arcuate web member having a convex edge and a plurality of recesses spaced along said edge and convergingly open toward the latter, said web member being received in said groove with said edge contacting the bottom of said groove and said ribs overlying at least the major parts of said recesses, said ribs being deformed at spaced locations into positive locking engagement with said recesses, thereby permanently fastening said web member to said flange member.

References Cited in the file of this patent

UNITED STATES PATENTS

| | | |
|---|---|---|
| 1,862,124 | Skelton | June 7, 1932 |
| 2,140,727 | Williams | Dec. 20, 1938 |
| 2,404,118 | Yawman | July 16, 1946 |
| 2,617,146 | Lindner et al. | Nov. 11, 1952 |

FOREIGN PATENTS

| | | |
|---|---|---|
| 714,422 | Germany | Nov. 28, 1941 |
| 840,183 | Germany | May 29, 1952 |